United States Patent [19]

Holst

[11] 4,037,346

[45] July 26, 1977

[54] TUBE FLY, AND METHOD FOR ITS PRODUCTION

[76] Inventor: Johan Wilhelm Isaachsen Holst, Lybekkveien 39 A, Oslo 3, Norway

[21] Appl. No.: 659,851

[22] Filed: Feb. 20, 1976

[30] Foreign Application Priority Data

Feb. 20, 1975 Norway .................................. 750583

[51] Int. Cl.² ............................................ A01K 85/00
[52] U.S. Cl. .................................... 43/42.14; 43/42.2; 43/42.53
[58] Field of Search ..................... 43/42.14, 42.2, 42.53

[56] References Cited

U.S. PATENT DOCUMENTS

| 295,350 | 3/1884 | Chapman | 43/42.2 |
|---|---|---|---|
| 496,441 | 5/1893 | Pepper, Jr. | 43/42.2 |
| 1,758,344 | 5/1930 | Wright et al. | 43/42.2 |
| 2,497,807 | 2/1950 | Wood | 43/42.2 |
| 2,606,387 | 8/1952 | Garner | 43/42.2 |
| 3,439,443 | 4/1969 | Weimer | 43/42.14 X |

Primary Examiner—Russell R. Kinsey
Assistant Examiner—Daniel J. Leach
Attorney, Agent, or Firm—Wenderoth, Lind & Ponack

[57] ABSTRACT

An artificial fly of the tube type for use in fly fishing, in which a plurality of thin-walled fins are bonded to the tube body to produce a spinning action when the tube fly is pulled through the water, and a preferred method of producing such tube fly.

28 Claims, 11 Drawing Figures

U.S. Patent July 26, 1977 Sheet 1 of 4 4,037,346
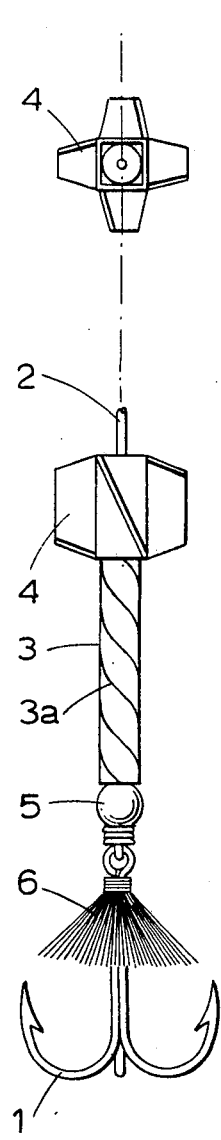
Fig.1A
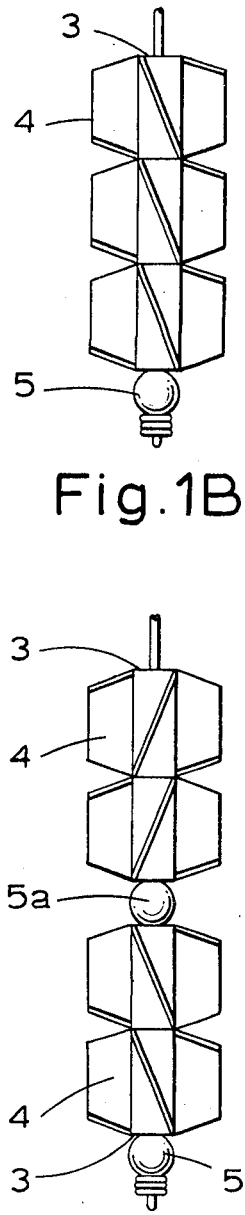
Fig.1B
Fig.1C
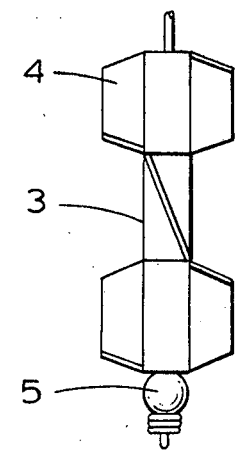
Fig.1D

TUBE FLY, AND METHOD FOR ITS PRODUCTION

BACKGROUND OF THE INVENTION

The present invention relates to an artificial fly particularly intended for use in fly fishing on rivers and lakes.

By the term "fly" as used herein is meant any artificial lure or immitation suitable for use in connection with ordinary tackle for fly fishing. Artificial flies for fly fishing are given their attractive "fishing" appearance by dressing a single hook, a double hook or a treble hook with feathers, hairs and the like in a variety of colours and patterns. In a relatively new type of artificial fly — the tube fly — the dressing or part thereof is attached to a tube sleeve such as a piece of plastic tubing, this tube sleeve being positioned around and onto the cast or leader which forms an extension of the fly line, whereafter a treble hook is tied to the end of the cast or leader in an ordinary manner.

The object of the present invention is to provide a novel and improved construction of the tube fly which makes it possible to transfer to fly fishing also the good fishing effects otherwise obtained with lures for spinning.

Fly fishing and spinning do in reality represent two completely different fishing methods, each requiring its own kind of rod and specific tackle and its own casting technique. In fly fishing it is the weight of the fly line with its accurately calculated weight distribution combined with the carefully adjusted action of the flexing fly rod, which makes it possible to cast out the fly. The fly itself should, therefore, have the lowest possible weight in order not to interface with the combined action of the fly rod and fly line. The typical weight of artificial flies thus varies between 0.05 g and 0.5 g. When casting flies as heavy as 1.5 g or more, particularly heavy fly rods and lines are needed.

In spinning and in spoon fishing, however, it is the weight of the lure itself which pulls out the fishing line and thus determines the distance over which the lure may be cast. The lures used for spinning and for spoon fishing must therefore have an appreciable weight in order to permit proper casting, whereas the fishing line should be as thin and as light as possible. Normally the weight of these lures for spinning and for spoon fishing lies between 12 and 28 g., and varies from a minimum of 2.5 g. when used in connection with the lightest possible spinning tackle and up to 100 g. and more for coarse see fishing using heavy spinning tackle.

From spinning and spoon fishing it is well known that a good fishing effect may be obtained by letting the lure itself rotate in the water, as is the case with devon spinners and numerous other spinners. Through the aid of propellers or vanes mounted at an angle of some 60° to 75° to the axis of rotation, these spinners are given a high rotational velocity which may amount to 40 revolutions per second and more. Such a high rotational velocity is necessary in order to overcome the friction between the spinner and its mount consisting of a swivel arrangements or a metal shaft having glass or plastic beads serving as a bearing in front of a treble hook. Because of the weight needed in the spinner for proper casting the friction between the spinner and its mount causes a considerable fraction of the rotational forces to be transferred to the line itself, thereby giving rise to heavy twisting of the fishing line. For that reason swivel arrangements and preferably also anti-kink devices are needed in order to avoid such twisting of the line during fishing.

Rotating lures of this kind have, however, proved very efficient in fishing and a variety of such spinners have consequently appeared on the market, ranging from heavy cast metal tubes to lighter plastic or metal spinners with metal shafts and vanes for their rotation. A common feature of all these spinners, however, is the fact that in addition to their need for special mounts causing friction and subsequent twisting of the line, their construction results in an appreciable weight with 2.5 g. as a practical minimum. For proper casting of this kind of spinners and spinning lures a spinning rod and spinning tackle is therefore needed together with anti-twist devices.

SUMMARY OF THE INVENTION

The object of the present invention is to combine the attractiveness of the rotating lures used for spinning with the advantage of the tube fly used in fly fishing. The invention comprises a tube sleeve of a light weight material such as plastic tubing, having one or more sets or pairs of thin-walled fins attached to its sides by means of an adhesive or by other means, the fins being inclined at a certain angle $\alpha$ to the tube axis, thereby causing the tube to rotate when being pulled through the water. The tube is adapted to rotate freely on any line, cast or leader, to the end of which a treble hook or any other hook is fastened in the usual manner, using a small plastic or glass bead as a bearing between the rotating tube and the hook.

With a construction according to the invention the weight of this novel rotating tube fly is kept well below 1.5 g. and in fact below 0.5 g. It should be understood that it is an important feature of the invention that the weight of the rotating tube fly is kept at this low weight. This rotating tube fly can therefore easily be cast with a fly rod and a fly line, eliminating at the same time transference of any significant amount of rotational forces to the cast or to the line. Cumbersome arrangements comprising swivels and anti-kink devices otherwise needed with lures for spinning in order to prevent twisting of the line, are thus fully avoided.

In conformity with ordinary tube flies, the rotating tube fly according to the invention may have the whole or part of a fly dressing, consisting of feathers, hairs and the like, attached to the fly body or to the hook.

The effectiveness of the rotating tube fly as a fishing lure may be considerably augmented by applying two or more colour markings alternating along the circumference of the tube or to its sets of fins, these colour markings causing an attractive twinkling or flashing effect provided the tube rotates at a sufficiently low rotational speed on its passage through the water.

The whole or part of the tube, constituting the main fly body, may also have colour and/or metallic strips forming a helical pattern around the tube, which give rise to a longitudinal and most life-like optical effect when the tube rotates at a sufficiently low rotational speed.

From cinematography it is well known that motion pictures when shown in sequence at a rate faster than 16 to 18 pictures per second, will merge visually into an optically stable picture. When, however, the pictures are changing at a frequency lower than this optical limit of 16 to 18 times per second, they start to twinkle because the individual pictures are then becoming visually separated from each other. According to an important feature of the invention, therefore, the fins attached to the rotating tube are inclined relative to the axis of rotation at such an angle α that the rotational speed of the fly, when pulled through the water at a velocity relative to the surrounding water corresponding to normal speed of retrieval of the line during fishing, is kept below such limit of 16 to 18 time per second, and preferably not exceeding 10 r.p.s., the pairs or sets of alternating colour markings applied to the tube or to its fins thereby giving rise to distinctly separated light or colour flashes. At rotational speeds higher than 16 to 18 r.p.s., as is the case with ordinary devon and other spinners, the colour markings will appear blurred into a diffuse mixture of colours without any pronounced twinkling effect.

When finishing ordinary salmon and sea trout rivers a favourable rotational speed of the rotating tube fly is obtained when the fins form an angle α to the tube axis between 14° and 18°. In particularly slow waters — or when retrieving the line slowly in still waters — the angle α of the fins should be between 16° and 20°, but preferably not more than 25°. In rapid waters — or when retrieving the line rapidly in still waters — the angle α should be between 12° and 16°, but not less than 10°. The curves in FIG. 2 show the relationships between rotational speed of the rotating tube fly, the angle α of the fins and the velocity of flow in the surrounding water.

The intensity of the twinkling effect from the alternating colour markings on the rotating tube fly or on its fins, may be varied by altering the contrast between the colours. The optical effect of a life-like and longitudinal movement evoked by the helically formed pattern of colour or metallic strips around the tube, may be varied by altering the pitch of the helicals and by varying the contrast between the colours used. For ordinary fishing in rivers a pitch of about 45° has proved to give a good optical effect. The pitch should not be less than 20° nor should it exceed 75°, as then the helical effect is substantially reduced.

BRIEF DESCRIPTION OF THE DRAWINGS

Several embodiments of the invention are described in detail below with reference to the accompanying drawings. Like parts are denoted by like reference numbers in the various embodiments illustrated in the figures.

FIG. 1A is a side view and an end view of one embodiment according to the invention, while modified embodiments are shown in FIG. 1B, 1C and 1D.

DETAILED DESCRIPTION OF THE INVENTION

Figure 2:
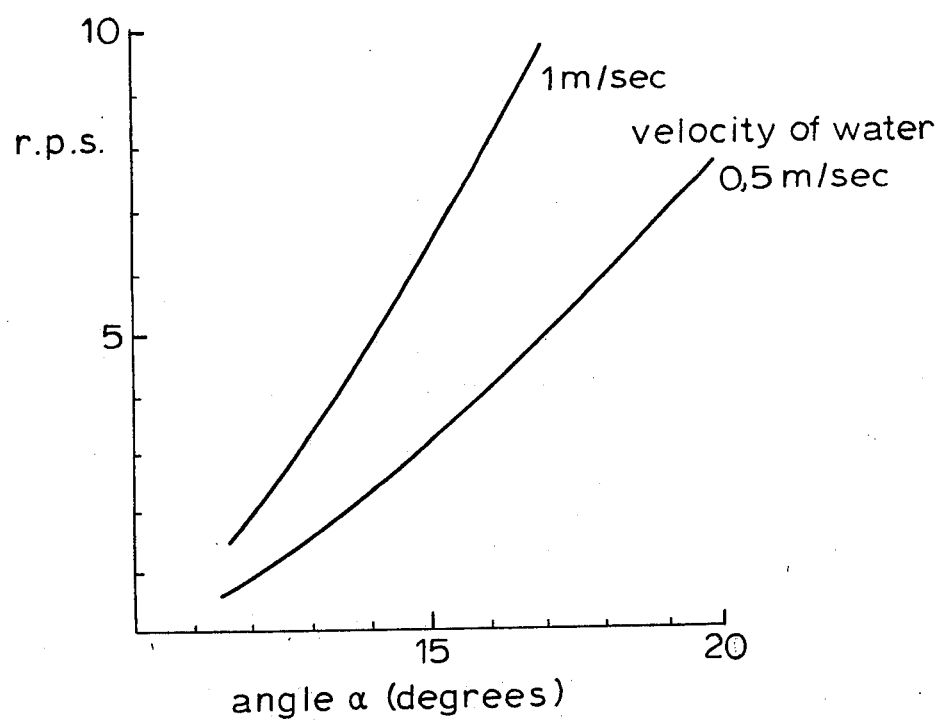
FIG. 2 is a diagram showing the rotational speed of the fly body in relation to the angle α of the fins and to the velocity of flow of the water.

The rotating tube fly illustrated in FIG. 1A includes a treble hook 1 attached to a line or to a cast or leader 2, over which a relatively rigid and thin-walled piece of a tube 3, e.g. of plastic, positioned in a known manner in front of the hook 1. The size of the inner diameter of the tube 3 is chosen so that the latter is easily rotatable on the line 2. According to the invention the tube or fly body 3 is provided with one or more sets or pairs of fins 4 preferably like in numbers, for example two or four fins, inclined at an angle α relative to the tube axis, and bonded to the tube by an adhesive or by other means. The oblique arrangement of the fins 4 cause the fly body 3 to rotate or spin when the fly is pulled through the water during fishing. A small bead 5 of plastic or glass may be positioned on the line 2 between the hook 1 and the rotating tube 3 to serve as a bearing facilitating the spinning movement of the tube. The hook 1 may be provided with the whole or part of a fly dressing 6, consisting of feathers, hairs or the like, while the tube 3, which constitutes the body of the fly, may be provided with colours arranged in a pattern 3a as described more in detail below.

FIG. 1B illustrates a modified embodiment of the invention, in which three like sets of fins 4 are assembled in a row along the tube 3. It should be understood, however, that the invention may include any number of fins or sets of fins that cause spinning of the tube when moved relative to the surrounding water provided that the weight of the tube 3 with fins 4 is kept sufficiently low, preferably below 0.5 g. and not exceeding 1.5 g., in order to avoid transference of any significant rotational force to the line itself, which would cause twisting of the line, and to permit the rotating tube fly according to the invention to be cast properly by means of even light fly rods.

Owing to the low weight of the fly body, and the resulting insignificant transference of rotational forces, two different tubes or fly bodies may be assembled on the same line, having their respective fins inclined in opposite directions, as depicted in FIG. 1C. Small beads 5a and 5 inserted as bearings between the two tubes and between the last tube and the hook permit the two tubes to rotate in opposite directions thereby providing a further life-like effect.

In FIG. 1D is shown a simplified form of the invention in which each fin set or pair of fins includes only two fins 4.

The present invention includes also methods for producing the rotating tube fly according to the invention, and a preferred method for such a production comprises the following main steps.

One or more strips of coloured plastic or metal foil are wrapped in a helical pattern around a certain length of plastic tubing having suitable internal and external diameters, the strips preferably being bonded to the tubing by means of an adhesive. At intervals along the length of the plastic tubing, corresponding to the length of the final fly body 3, sets of fins 4 which have been formed from blanks 4', are fixed in an oblique position at an angle α to the tube axis. The plastic tubing may now be cut into separate tubes each having a length corresponding to the interval between the sets of fins attached to the tubing, each forming the fly body of the rotating tube flies thus produced. Part or whole of a fly dressing may be applied before or after the tubing is cut into separate fly bodies.

Because of the oblique position of the fins 4 having an angle α relative to the tube axis, the material of which the fins 4 are produced, e.g. thin metal sheets, would have to be subject to considerable mechanical deformation in order to provide the fins 4 with a contact surface for their bonding to the plastic tubing having the same rounded shape as said tubing. A particularly advantageous method which avoids this difficult problem and which provides a simple manufacturing process for the rotating tube fly according to the invention, is as follows.

Figure 3A:
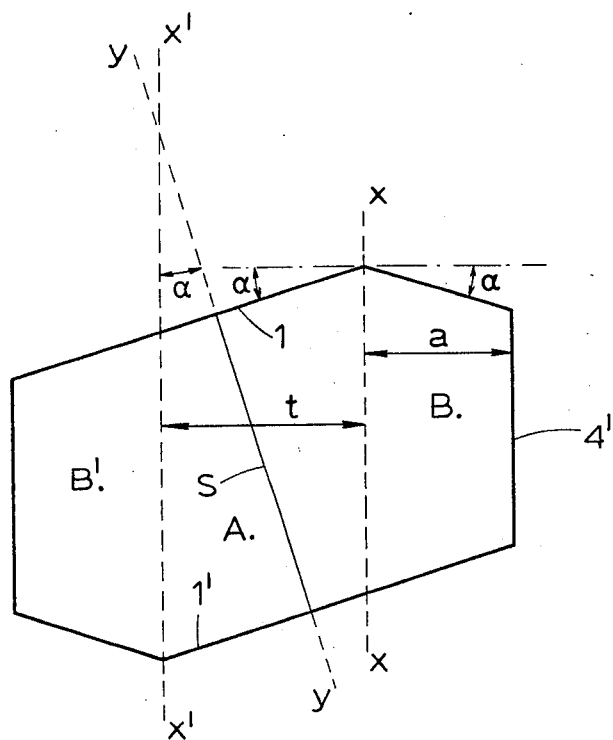
FIG. 3A and B illustrate blanks to be formed into fins to be attached to the tube.

From preferably lacquered or otherwise coated metal sheets with a preferred gauge between 0.08 and 0.16 mm four identical sheet details or blanks 4' are cut or punched out as shown in FIG. 3A. Each blank 4' comprises a mid-section A and two identical end-sections B and B' as defined by the folding lines x—x and x'—x'. The length of the end-sections B and B' corresponds to the desired height of the completed fins 4. The distance t between the parallel folding lines x—x and x'—x', which corresponds to the length of the mid-section A longitudinally of the blank, is approximately equal to d.cos α, where d is the outer diameter of the tube 3, and α is the desired angle between the fins and the tube axis. Laterally of the blank the mid-section A is defined by two parallel lines 1 and 1' inclined at an angle α to the line normal to the folding lines x—x and x'—x', and spaced by a distance S as determined by the relationship:

$$\frac{d}{\tan\alpha} \geqq S \geqq 2a \cdot \sin\alpha$$

A further folding line y—y extends centrally through the blank normal to the side lines 1 and 1', inclined at an angle α to the first mentioned folding lines x—x and x'—x'. As will be understood from the description below, the folding line y—y will substantially be parallel to the axis of the tube 3, i.e. to the axis of rotation of the completed fly.

The two end-sections B and B' have a symmetrical shape corresponding to the desired shape of the fins 4. In the preferred embodiment of the invention the end-sections B and B' are trapezoidal, with the folding lines x—x and x'—x' respectively as base lines, one of the side lines of each end-section being an extendsion of the side line 1 or 1' in the mid-section A. The end-sections B and B' may, however, have any symmetrical form, for example an arc inscribed in the above mentioned trapezoid.

Figure 4:
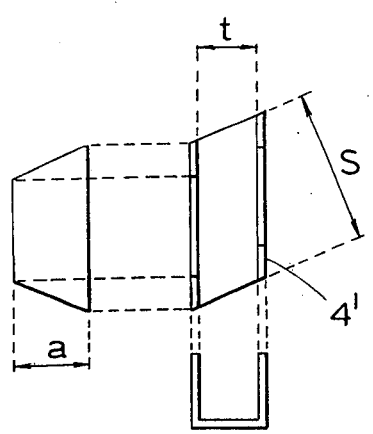
FIG. 4–7 illustrate in various views progressive steps in forming the fins from the blanks shown in FIG. 3A and B.
Figure 5:
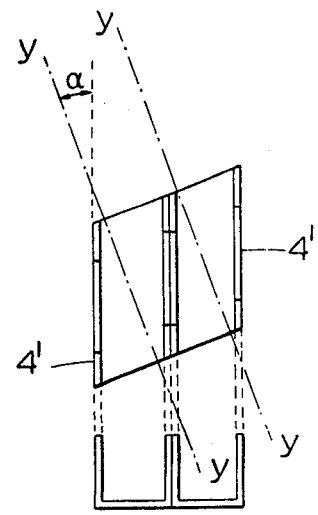
Figure 6:
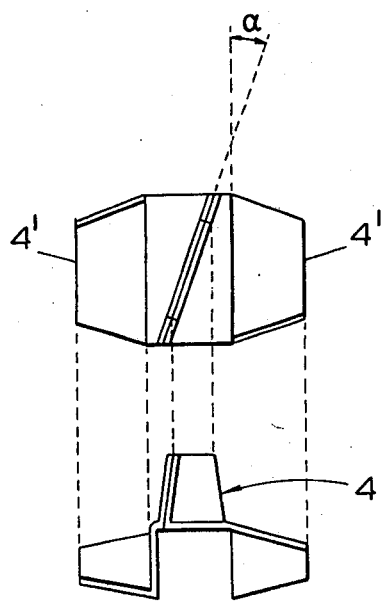

The end-sections B and B' of each of the four blanks 4' are now folded substantially 90° up from the plane of the blank along the folding lines x—x and x'—x' into a near U-shaped body, as shown in FIG. 4, and then these folded blanks or U-shaped bodies are bonded together by means of an adhesive or by other means in pairs back to back along the outer face of one end-section B or B', as illustrated in FIG. 5. Then the outer part of the blanks in each pair is folded diagonally downward from the plane of the blanks along the folding line y—y into the shape illustrated in FIG. 6. Finally the two bonded and formed blank pairs are placed diametrically opposed to each other onto the tube 3, the free end-sections B and B' of the blank pairs, covering each other accurately owing to the above described diametrical configuration of the blanks, being bonded together back to back by means of an adhesive or by other means. Optionally several such sets of fins may be bonded in a row along the tube 3, as shown in FIG. 1B.

Figure 3B:
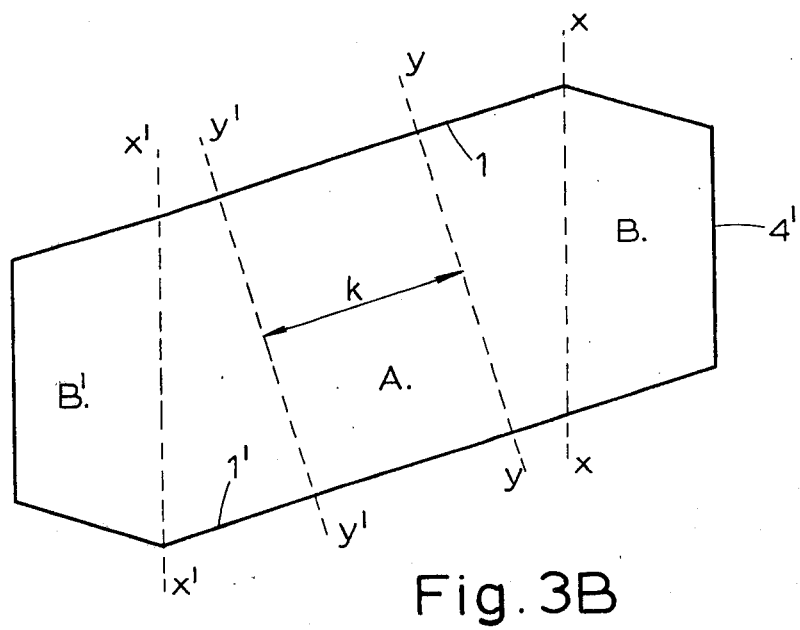
Figure 7:
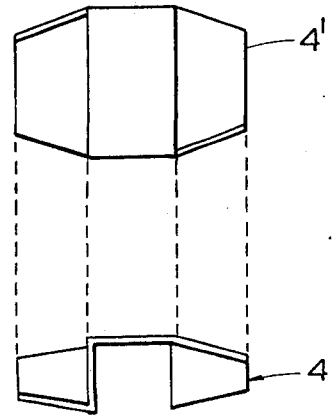

In a simplified embodiment the mid-section A of the fin blank 4' is extended a distance k which equal to the external diameter of the tube (FIG. 3B), as defined by two folding lines y—y and y'—y' inclined at an angle α to the side lines, and the blank is folded as indicated in FIG. 7. Thus, two fin blanks 4' of this type replace four fin blanks of the previously described type, and provides in all two fins when assembled on the tube as shown in FIG. 1D.

The tube 3 with its fins 4 is now ready to be positioned onto the line or cast 2 together with a bearing bead 5, after which the hook 1 is attached to the line and fishing can commence.

In the examples described lacquered or otherwise coated metal sheets are mentioned as preferred material for the fins 4, rolled phosphor-bronze being a particularly advantageous material. However, it is within the scope of the invention that the fins may be produced from other types of material, provided that the low weight which is characteristic of the invention is maintained, and provided that the necessary mechanical strength is retained.

A typical rotating tube fly constructed according to the invention, has the following characteristics:

Smaller fly: Plastic tube body of 1.5 cm. length and 0.2 cm. diameter. Two fins made from 0.01 cm. phosphor-bronze sheet. Total weight including treble hook and plastic bead . . . 0.15 g.

Medium sized fly: Plastic tube body of 2 cm. length and 0.25 cm. diameter. Four fins made from 0.01 cm. phosphor-bronze sheet. Total weight including treble hook and plastic bead . . . 0.29 g.

Thus the weight of the rotating tube fly according to the invention is well below 0.5 g. Even for the biggest flies having a plastic tube of external diameter 0.5 cm. and a length 5 cm., the weight will be well below 1.5 g. This fact clearly distinguishes the rotating tube fly according to the invention from the various well known forms of spinning lures, and makes it clear why the novel rotating tube fly can be properly and easily cast even with light fly rods and lines without causing any twisting of the line or the cast.

The rotating tube fly according to the invention may be used with or without the previously mentioned fly dressing 6, and patterns as well as colours may be adjusted to the fishing situation and the type of fish involved. Instead of being attached to the hook 1 the fly dressing 6, or part thereof, may be attached to the tube or fly body 3, preferably arranged for an optimal adaption to the direction of flow of the water.

Like ordinary fly imitations the novel rotating tube fly according to the invention may also be used as a lure for trolling or jigging.

I claim:

1. A tube fly for use in fly fishing with a fly rod and a fly line having a hook and a bead bearing at the end thereof, said tube fly comprising:
   a tube shaped body having an inner diameter dimensioned to form means for receiving therethrough a fly line such that said tube body freely rotates directly about such fly line in front of a hook and a bead bearing;
   at least one set of thin-walled fins bonded to said tube body, the fins of said at least one fin set being inclined at an angle to the axis of said tube body, said at least one fin set comprising means to cause spinning of said tube body about the fly line without substantial twisting of the fly line when the assembled fly is pulled through the water; and
   the weight of said tube fly not exceeding 1.5 g.

2. A tube fly as claimed in claim 1 wherein said fins are inclined at an angle betweeen 10° and 25° to said tube axis.

3. A tube fly as claimed in claim 1, wherein said tube body is provided with at least two different colour strips and/or metallic strips helically wrapped around said tube body.

4. A tube fly as claimed in claim 3, wherein said hellical strips have a pitch angle from 20° to 75°.

5. A tube fly as claimed in claim 4, wherein said helical strips have a pitch angle of 45°.

6. A tube fly as claimed in claim 1, wherein said tube body is provided with at least two alternating colour markings on one of said fins and along the circumference of said tube body.

7. A tube fly as claimed in claim 1, further comprising a hook and a fly dressing applied thereto.

8. A tube fly as claimed in claim 1, further comprising a fly dressing applied to said tube body for an optimal adaptation to the rotational movement of said tube body in water.

9. A tube fly as claimed in claim 1, wherein each said set of fins includes four fins angularly spaced 90° around said tube body.

10. A tube fly as claimed in claim 1, wherein each said set of fins includes two diametrically opposed fins on said tube body.

11. A tube fly as claimed in claim 1, wherein at least two tube bodies and corresponding sets of fins are arranged for rotation in opposite directions when the assembled fly is pulled through the water.

12. A method of producing a tube fly of the type including a tube body having inclined fins attached thereto, said method comprising:
cutting from thin metal sheets four similar blanks each including a mid-section and two end-sections, with said end-sections having a shape corresponding to the desired shape of the fins, said mid-section being defined relative to said end-sections by two first parallel folding lines spaced by a distance $t$ equal to $d.\cos\alpha$, wherein d is the outer diameter of the tube body, said mid-section being laterally defined by two parallel side lines spaced by a distance S, where:

$$\frac{d}{\tan\alpha} \geq S \geq 2a \cdot \sin\alpha$$

a being the maximum height of the fins, said side lines being inclined at an angle to $\alpha$ to a line normal to said first folding lines;
folding said end-sections substantially 90° upward from the plane of the blank along said two first folding lines;
bonding the thus folded blanks in pairs back to back along the outer surface of one end-section;
folding down the outer part of each pair of bonded blanks substantially 90° along a diagonal second folding line normal to said side lines; and
placing the two folded and bonded blank pairs diametrically opposed to each other onto a tube body and jointly bonding the adjacent free end-sections of said blank pairs.

13. A method of producing a tube fly of the type including a tube body having inclined fins attached thereto, said method comprising:
cutting from thin metal sheets two similar blanks each including a mid-section and two end-sections, with said end-sections having a shape corresponding to the desired shape of the fins, said mid-section being defined relative to said end-sections by two first parallel folding lines, said mid-section being laterally defined by two parallel side lines spaced by a distance S, where:

$$\frac{d}{\tan\alpha} \geq S \geq 2a \cdot \sin\alpha$$

a being the maximum height of the fins and $d$ being the outer diameter of the tube body, said side lines being inclined at an angle $\alpha$ to a line normal to said first folding lines, said two first folding lines being spaced by an amount equal to $d.\cos\alpha$ plus an additional amount taken parallel to said side lines equal to said outer diameter of said tube body, said additional amount being defined by two second folding lines normal to said side lines;
folding said blanks substantially 90° upwards along said second folding lines;
thereafter folding said end-sections down substantially 90° along said first folding lines;
placing the thus two folded blanks diametrically opposed to each other onto the tube body; and
jointly bonding together the adjacent free end-sections of said fold blanks.

14. A method of producing a tube fly as claimed in claim 12, wherein said end-sections are formed as trapezoids the base lines of which comprise said first folding lines, and said side lines are inclined at an angle $(90-\alpha)°$ to said base line.

15. A method of producing a tube fly as claimed in claim 13, wherein said end-sections are formed as trapezoids the base lines of which comprise said first folding lines, and said side lines are inclined at an angle $(90-\alpha)°$ to said base line.

16. A method of producing a tube fly as claimed in claim 12, wherein said end-sections are defined by a curve inscribed in a trapezoidal shape.

17. A method of producing a tube fly as claimed in claim 13, wherein said end-sections are defined by a curve inscribed in a trapezoidal shape.

18. A fishing assembly comprising:
a fly line;
a hook and bead bearing attached to an end of said fly line;
a tube shaped body freely rotatably positioned directly about said fly line in front of said hook and bead bearing;
at least one set of thin-walled fins bonded to said tube body, the fins of said at least one fin set being inclined at an angle to the axis of said tube body, said at least one fin set comprising means to cause spinning of said tube body about said fly line without substantial twisting of said fly line when said fly line and tube body are pulled through the water; and
the weight of said tube body and fins not exceeding 1.5 g.

19. An assembly as claimed in claim 18, wherein said fins are inclined at an angle between 10° and 25° to said tube axis.

20. An assembly as claimed in claim 18, wherein said tube body is provided with at least two different colour strips and/or metallic strips helically wrapped around said tube body.

21. An assembly as claimed in claim 20, wherein said helical strips have a pitch angle from 20° to 75°.

22. An assembly as claimed in claim 21, wherein said helical strips have a pitch angle of 45°.

23. An assembly as claimed in claim 18, wherein said tube body is provided with at least two alternating colour markings on one of said fins and along the circumference of said tube body.

24. An assembly as claimed in claim 18, further comprising a fly dressing applied to said hook.

25. An assembly as claimed in claim 18, further comprises a fly dressing applied to said tube body for an optimal adaptation to the rotational movement of said tube body in water.

26. An assembly as claimed in claim 18, wherein said at least one set of fins includes four fins angularly spaced 90° around said tube body.

27. An assembly as claimed in claim 18, wherein said at least one set of fins includes two diametrically opposed fins on said tube body.

28. An assembly as claimed in claim 18, wherein at least two tube bodies and corresponding sets of fins are arranged for rotation in opposite directions when said fly line and tube bodies are pulled through the water.

* * * * *